(12) United States Patent
Yang et al.

(10) Patent No.: US 9,110,337 B2
(45) Date of Patent: Aug. 18, 2015

(54) DISPLAY DEVICE

(71) Applicant: SAMSUNG DISPLAY CO., LTD., Gyeonggi-do (KR)

(72) Inventors: Ji Hoon Yang, Gwangju (KR); Jung-Hun Noh, Yongin-si (KR); Keun Kyu Song, Yongin-si (KR); Hyun Sup Lee, Hwaseong-si (KR); Sang-Hee Jang, Gyeonggi-do (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 134 days.

(21) Appl. No.: 13/894,754

(22) Filed: May 15, 2013

(65) Prior Publication Data

US 2014/0192307 A1    Jul. 10, 2014

(30) Foreign Application Priority Data

Jan. 10, 2013    (KR) .................. 10-2013-0002983

(51) Int. Cl.
  *G02F 1/1343* (2006.01)
  *G02F 1/1345* (2006.01)
  *G02F 1/1339* (2006.01)

(52) U.S. Cl.
  CPC ...... *G02F 1/13394* (2013.01); *G02F 1/134363* (2013.01)

(58) Field of Classification Search
  USPC .................................. 349/155, 141, 143–144
  See application file for complete search history.

(56) References Cited

U.S. PATENT DOCUMENTS

| 7,391,493 | B2 | 6/2008 | Kim | |
|---|---|---|---|---|
| 7,609,357 | B2 | 10/2009 | Kim | |
| 8,045,126 | B2 | 10/2011 | Kim et al. | |
| 8,081,286 | B2 | 12/2011 | Kim et al. | |
| 8,102,498 | B2 | 1/2012 | Kanaya et al. | |
| 8,724,071 | B2 * | 5/2014 | Hashimoto | 349/156 |
| 2005/0259210 | A1 * | 11/2005 | Lee et al. | 349/156 |
| 2012/0133878 | A1 | 5/2012 | Hirakata | |
| 2012/0293752 | A1 * | 11/2012 | Takeda et al. | 349/96 |
| 2013/0235294 | A1 * | 9/2013 | Nomura | 349/43 |
| 2014/0014960 | A1 * | 1/2014 | Yamazaki et al. | 257/59 |

FOREIGN PATENT DOCUMENTS

| JP | 2002122841 | 4/2002 |
|---|---|---|
| JP | 2002156642 | 5/2002 |
| JP | 3395884 | 2/2003 |
| JP | 3522095 | 2/2004 |
| JP | 3808233 | 5/2006 |
| JP | 2010060960 | 3/2010 |

* cited by examiner

*Primary Examiner* — Hoan C Nguyen
(74) *Attorney, Agent, or Firm* — F. Chau & Associates, LLC

(57) ABSTRACT

A display device including: a first insulation substrate and a second insulation substrate facing each other; a first field generating electrode and a second field generating electrode disposed on the first insulation substrate, wherein the first and second field generating electrodes overlap each other via an insulating layer; a first signal line and a second signal line disposed on the first insulation substrate and connected to the first field generating electrode; a slit pattern disposed in the first field generating electrode or the second field generating electrode; and a spacer disposed between the first insulation substrate and the second insulation substrate, wherein the spacer overlaps a portion of the slit pattern.

17 Claims, 8 Drawing Sheets

DISPLAY DEVICE

CROSS-REFERENCE TO RELATED APPLICATION

This application claims priority under 35 U.S.C. §119 to Korean Patent Application No. 10-2013-0002983 filed in the Korean Intellectual Property Office on Jan. 10, 2013, the disclosure of which is incorporated by reference herein in its entirety.

TECHNICAL FIELD

The present invention relates to a display device. More particularly, the present invention relates to a display device for preventing a collision of liquid crystal when applying an electric field in the display device of a horizontal electric field type.

DISCUSSION OF THE RELATED ART

A liquid crystal display is one of the most widely used flat panel displays. The liquid crystal display includes two display panels provided with field generating electrodes such as a pixel electrode and a common electrode, and a liquid crystal layer that is disposed between the display panels. In the liquid crystal display, an image is shown by applying a voltage to a field generating electrode to generate an electric field in the liquid crystal layer, which determines an alignment of liquid crystal molecules in the liquid crystal layer to control polarization of incident light.

The liquid crystal display has light weight and thin formation characteristics; however, its side visibility is generally lower than front visibility. A liquid crystal display where a pixel electrode and a common electrode are formed on one substrate to form a horizontal electric field can achieve a wide viewing angle.

In the liquid crystal display of the horizontal electric field type, the pixel electrode or the common electrode are formed to have a slit pattern of a bar shape. The liquid crystal positioned on an edge of the slit pattern has a different rotation direction than surrounding liquid crystal when an electric field is applied, and thus the liquid crystal may collide. Accordingly, an area where the slit pattern is formed may be recognized by a user. This is referred to as white bruising.

Particularly, when an initial alignment direction of the liquid crystal is partly different from the surrounding liquid crystal due to an external force, the liquid crystal collides when an electric field is applied such that the slit pattern may be recognized by the user.

SUMMARY

A display device according to an exemplary embodiment of the present invention includes: a first insulation substrate and a second insulation substrate facing each other; a first field generating electrode and a second field generating electrode disposed on the first insulation substrate, wherein the first and second field generating electrodes overlap each other via an insulating layer; a first signal line and a second signal line disposed on the first insulation substrate and connected to the first field generating electrode; a slit pattern disposed in the first field generating electrode or the second field generating electrode; and a spacer disposed between the first insulation substrate and the second insulation substrate, wherein the spacer overlaps a portion of the slit pattern.

The display device may include a plurality of pixel areas, and the slit pattern may be disposed within a first pixel area of the pixel areas.

The spacer may overlap about 2 μm to about 4 μm of the slit pattern.

The first field generating electrode may be disposed within the first pixel area, and the second field generating electrode may be disposed on a surface of the first insulation substrate.

The slit pattern may be an opening in the second field generating electrode.

The first pixel area may be defined by an intersection of the first signal line and the second signal line.

The slit pattern may be disposed in a direction parallel to the second signal line.

The spacer may overlap an upper edge of the slit pattern, a lower edge of the slit pattern, or the first signal line.

The spacer may overlap about 2 μm to about 4 μm of the upper edge or the lower edge of the slit pattern.

The spacer may be a column spacer on the first insulation substrate.

The display device may have a resolution of more than 400 pixels per inch (ppi).

The spacer may be one of a plurality of spacers and a number of the spacers may be 65% to 105% of a number of the pixel areas.

The spacer may cover a plurality of slit patterns.

A display device according to an exemplary embodiment of the present invention includes: a plurality of pixel areas; a first insulation substrate and a second insulation substrate facing each; a first field generating electrode and a second field generating electrode disposed on the first insulation substrate, wherein the first and second field generating electrodes overlap each other via an insulating layer; a first signal line and a second signal line disposed on the first insulation substrate and connected to the first field generating electrode; a slit pattern disposed in the first field generating electrode or the second field generating electrode; and a plurality of spacers disposed between the first insulation substrate and the second insulation substrate, wherein a number of the spacers is 65% to 105% of a number of the pixel areas.

The slit pattern may be disposed within a first pixel area of the pixel areas, and a first spacer of the spacers may overlap a portion of the slit pattern.

The first spacer may overlap about 2 μm to about 4 μm of the slit pattern.

The first spacer may cover a plurality of slit patterns.

The first spacer may be a column spacer on the first insulation substrate.

The display device may have a resolution of more than 400 ppi.

The first signal line and the second signal line may be crossed, the slit pattern may be disposed in a direction parallel to the second signal line, and the first spacer may overlap an upper edge of the slit pattern, a lower edge of the slit pattern, or the first signal line.

A display device according to an exemplary embodiment of the present invention includes: a first panel and a second panel facing each other; a pixel electrode disposed on the first panel; a common electrode disposed on the first panel; a slit pattern disposed in the pixel electrode or the common electrode; and a spacer disposed between the first and second panels and overlapping a side of the slit pattern.

DETAILED DESCRIPTION OF THE EMBODIMENTS

Figure 1:
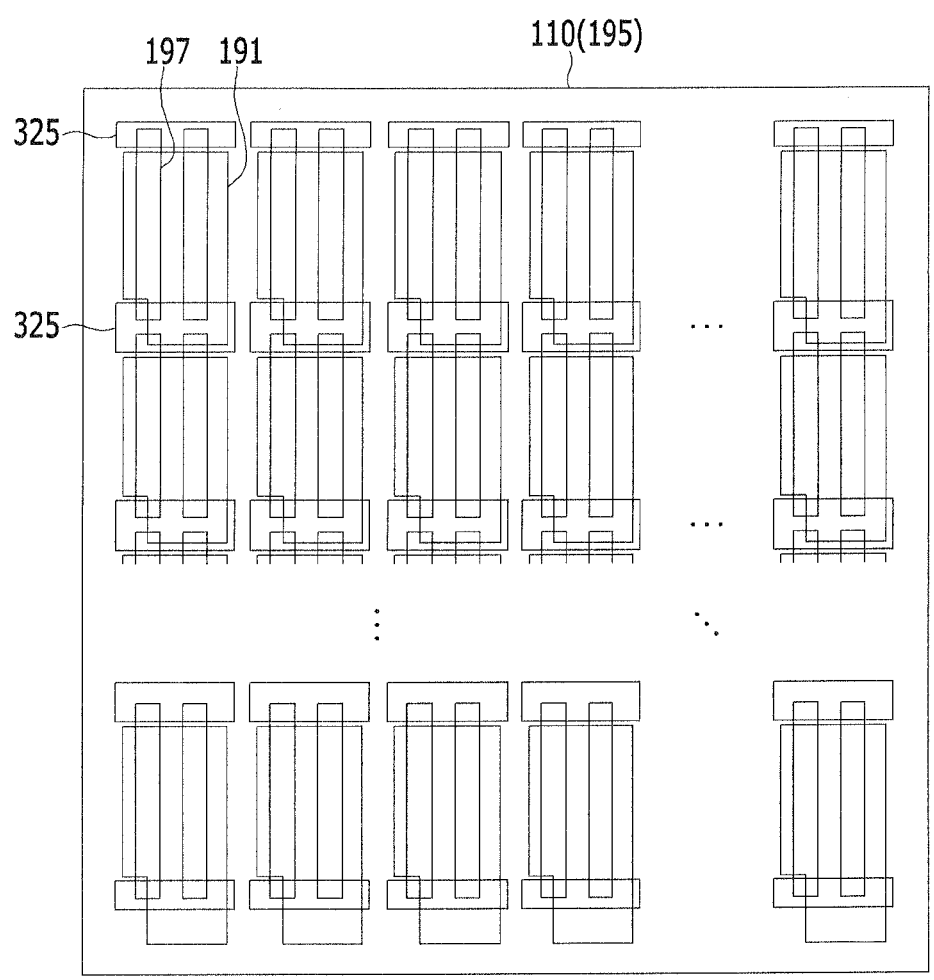
FIG. 1 is a layout view of a display device according to an exemplary embodiment of the present invention.

Exemplary embodiments of the present invention will be described more fully hereinafter with reference to the accompanying drawings. However, the present invention may be embodied in various different ways and should not be construed as limited to the embodiments disclosed herein.

In the drawings, the thickness of layers, films, panels, regions, etc., may be exaggerated for clarity. Like reference numerals may designate like elements throughout the specification and drawings. It will be understood that when an element such as a layer, film, region, or substrate is referred to as being "on" another element, it can be directly on the other element or intervening elements may also be present.

First, a display device according to an exemplary embodiment of the present invention will be described with reference to FIG. 1 to FIG. 4.

Figure 2:
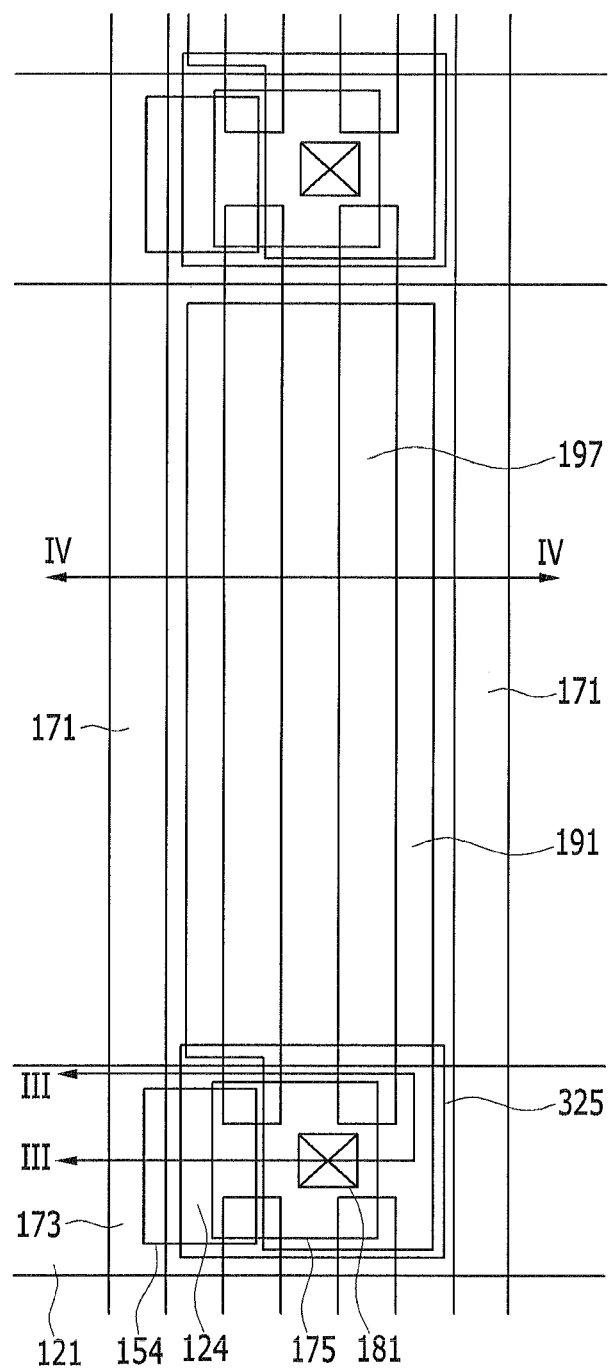
FIG. 2 is a layout view of a partial pixel of a display device according to an exemplary embodiment of the present invention.
Figure 3:
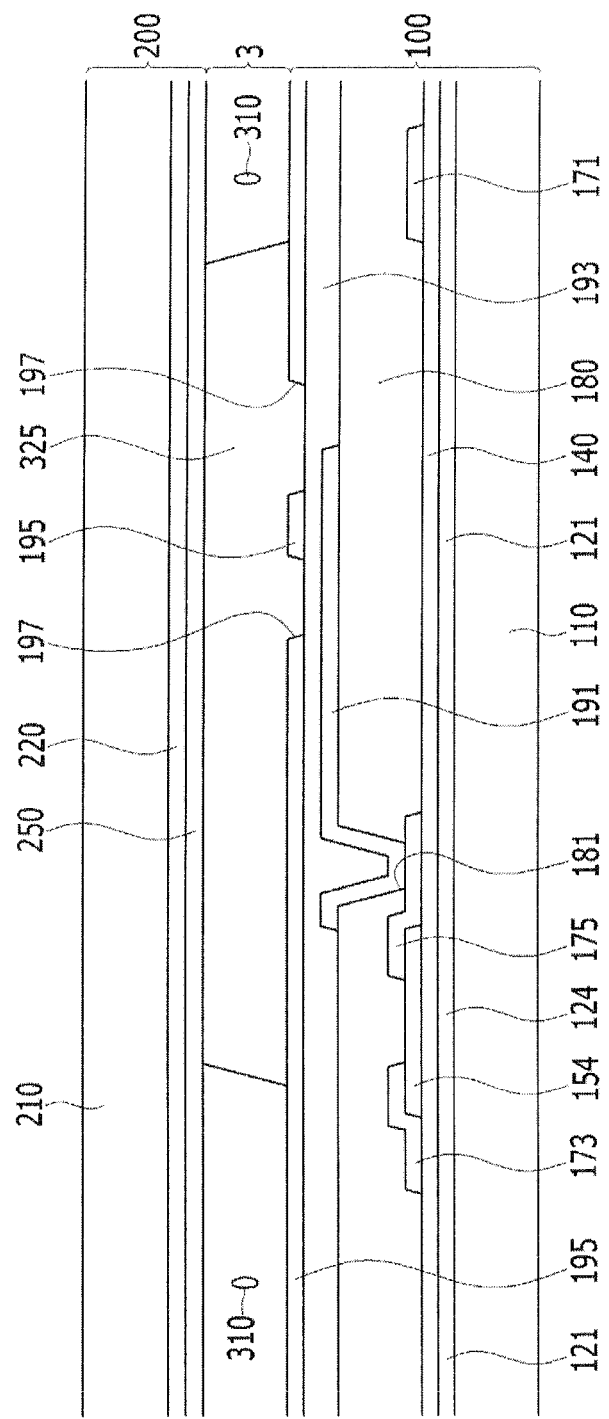
FIG. 3 is a cross-sectional view of the display device of FIG. 2 taken along line III-III.
Figure 4:
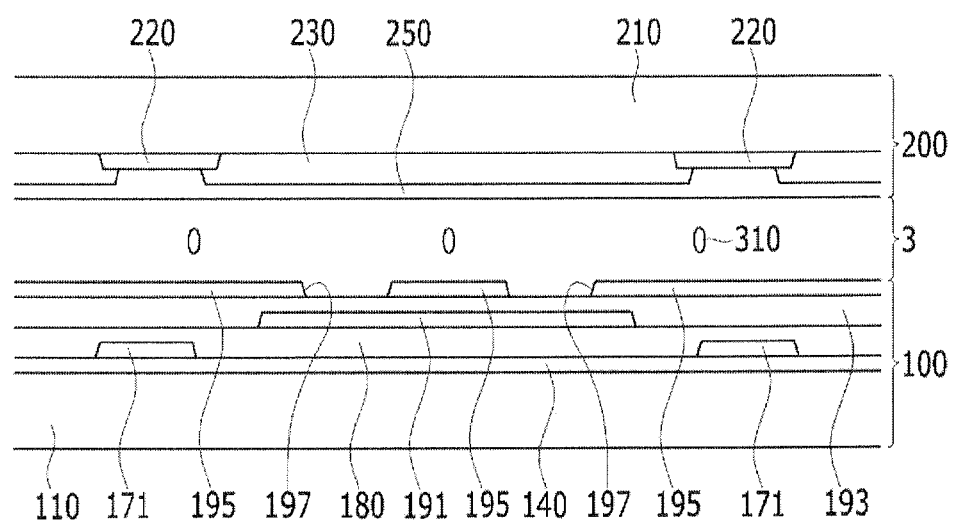
FIG. 4 is a cross-sectional view of the display device of FIG. 2 taken along line IV-IV.

FIG. 1 is a layout view of a display device according to an exemplary embodiment of the present invention, and FIG. 2 is a layout view of a partial pixel of a display device according to an exemplary embodiment of the present invention. FIG. 3 is a cross-sectional view of the display device of FIG. 2 taken along line III-III, and FIG. 4 is a cross-sectional view of the display device of FIG. 2 taken along line IV-IV.

Referring to FIG. 1 to FIG. 4, a liquid crystal display according to an exemplary embodiment of the present invention includes a lower panel 100, an upper panel 200, and a liquid crystal layer 3 interposed between the two panels 100 and 200.

First, the lower panel 100 will be described.

A plurality of gate lines 121 are formed in one direction on a first insulation substrate 110 made of transparent glass or plastic.

The gate lines 121 extend in a transverse direction and transfer gate signals. Further, a gate electrode 124 connected to the gate line 121 is formed. The gate electrode 124 may be formed of a portion of the gate line 121 as shown, or may be protruded from the gate line 121.

Although not shown, a storage electrode may be further formed and not be connected to the gate line 121 and the gate electrode 124. The storage electrode may be formed in a direction parallel to the gate line 121, and the storage electrode may be applied with a predetermined voltage such as a common voltage.

A gate insulating layer 140 is formed on the gate line 121. The gate insulating layer 140 may be formed of an inorganic insulating material such as silicon nitride (SiNx) or silicon oxide (SiOx). In addition, the gate insulating layer 140 may be made of a single layer or a multiple layers.

A semiconductor 154 is formed on the gate insulating layer 140. The semiconductor 154 may be positioned on the gate electrode 124. The semiconductor 154 may be made of amorphous silicon, polycrystalline silicon, or a metal oxide.

Although not shown, ohmic contacts may be further formed on the semiconductor 154. The ohmic contacts may face each other with respect to the gate electrode 124 and may be disposed in a pair on the semiconductor 154. The ohmic contacts may be formed of n+ hydrogenated amorphous silicon heavily doped with an n-type impurity such as phosphorous, or they may be made of silicide. However, when the semiconductor 154 is the oxide semiconductor, the ohmic contacts may not be formed. When the semiconductor 154 is the oxide semiconductor, a barrier layer and a capping layer may be formed under or on the semiconductor 154.

A plurality of data lines 171, source electrodes 173 connected to the data lines 171, and drain electrodes 175 separated from the source electrodes 173 are formed on the semiconductor 154. Each source electrode 173 may be formed of a portion of the data line 171 as shown, and may be protruded from the data line 171. The source electrode 173 and the drain electrode 175 are separated from each other on the semiconductor 154. The semiconductor 154 may be entirely formed under the data line 171.

The data line 171 extends in a longitudinal direction and transmits a data signal. The data signal transmitted to the data line 171 is applied to the source electrode 173.

The gate electrode 124, the semiconductor 154, the source electrode 173, and the drain electrode 175 form one thin film transistor. When the thin film transistor is turned on, the data signal applied to the source electrode 173 is transmitted to the drain electrode 175.

A passivation layer 180 is formed on the data line 171, the source electrode 173, the drain electrode 175, and the semiconductor 154 exposed between the source and drain electrodes 173 and 175. The passivation layer 180 may be made of an organic insulating material or an inorganic insulating material, and may be formed of a single layer or multiple layers.

The passivation layer 180 has a contact hole 181 exposing at least a portion of an upper surface of the drain electrode 175.

A pixel electrode 191 connected to the drain electrode 175 through the contact hole 181 is formed on the passivation layer 180. The pixel electrode 191 is connected to the drain electrode 175 and receives the data signal from the drain electrode 175 when the thin film transistor is turned on.

The first insulation substrate 110 and a second insulation substrate 210 may include a plurality of pixel areas, and the gate lines 121 and the data lines 171 are crossed thereby defining the pixel areas.

The pixel electrode 191 may be formed within a pixel area and may have a plate shape filling most of that one pixel area. The shape of the pixel electrode 191 may be a polygon having edges substantially parallel to the gate line 121 and the data line 171. The pixel electrode 191 may be made of a transparent metal material such as indium-tin oxide (ITO) and indium-zinc oxide (IZO).

An insulating layer 193 is formed on the pixel electrode 191. The insulating layer 193 may be made of the organic insulating material or the inorganic insulating material, and may be formed of a single layer or multiple layers.

A common electrode 195 is formed on the insulating layer 193. The common electrode 195 may be entirely formed on the first insulation substrate 110. The common electrode 195 is applied with a predetermined voltage such as the common voltage.

The common electrode 195 may be made of the transparent metal material such as ITO and IZO.

The common electrode 195 includes a slit pattern 197, and the slit pattern 197 may be formed in the pixel area. The slit pattern 197 may also extend beyond the pixel area. One pixel area may include a plurality of slit patterns 197. In FIG. 2, one pixel area includes two slit patterns 197, however the present invention is not limited thereto and one pixel area may include three or more slit patterns 197. In addition, one pixel area may include just one slit pattern 197.

The slit pattern 197 of the common electrode 195 is formed to overlap the pixel electrode 191 with the plate shape. The slit pattern 197 may be formed of a shape extending in a direction parallel to the data line 171.

A first alignment layer (not shown) is coated on an inner surface of the lower panel 100.

Next, the upper panel 200 will be described.

A light blocking member 220 is formed on the second insulation substrate 210 made of transparent glass or the like. The light blocking member 220 is also called a black matrix, and prevents light leakage. The light blocking member 220 may be formed on a boundary of the pixel area such as the gate line 121, the data line 171, and the thin film transistor.

A plurality of color filters 230 are formed on the second insulation substrate 210. Most of the color filters 230 are disposed in the region enclosed by the light blocking member 220, and may be extended in the longitudinal direction according to the column arrangement of the pixel electrodes 191. Each of the color filters 230 may represent one of the primary colors such as red, green, and blue. Examples of the primary colors may include red, green, and blue, or yellow, cyan, and magenta. Although not shown, the color filters 230 may further include a color filter displaying a mixture of the primary colors or white as well as the primary colors.

An overcoat 250 is formed on the color filter 230 and the light blocking member 220. The overcoat 250 may be formed of an organic insulator, and it functions to prevent the color filter 230 from being exposed and provides a flat surface. The overcoat 250 may be omitted.

A second alignment layer (not shown) is coated on an inner surface of the upper panel 200.

The liquid crystal layer 3 interposed between the lower panel 100 and the upper panel 200 includes liquid crystal molecules 310 that are oriented such that their major axes are substantially parallel to the surfaces of the two panels 100 and 200 when no electric field is applied.

The liquid crystal layer 3 may have positive dielectric anisotropy or negative dielectric anisotropy. The liquid crystal molecules 310 of the liquid crystal layer 3 may be aligned to have a pretilt in a predetermined direction, and the pretilt direction of the liquid crystal molecules 310 is changed according to the dielectric anisotropy of the liquid crystal layer 3.

A backlight unit (not shown) for generating light to provide to the panels 100 and 200 may be further included outside the first insulation substrate 110 of the lower panel 100.

The pixel electrode 191 to which a data voltage is applied and the common electrode 195 to which a common voltage is applied generate an electric field, thereby determining a direction of the liquid crystal molecules 310 of the liquid crystal layer 3 that is positioned on the two electrodes 191 and 195. In the display device according to an exemplary embodiment of the present invention, a horizontal electric field may be formed between two field generating electrodes (e.g., the first field generating electrode and the second field generating electrode), and in the present exemplary embodiment, the pixel electrode 191 may be the first field generating electrode and the common electrode 195 may be the second field generating electrode.

A spacer 325 is formed between the first insulation substrate 110 and the second insulation substrate 210. The spacer 325 may be formed on the first insulation substrate 110, and in this case, the spacer 325 is formed on the common electrode 195. The spacer 325 may be a column spacer. A cell gap may be uniformly maintained between the lower panel 100 and the upper panel 200 by the spacer 325.

The spacer 325 is formed to overlap the edge of the slit pattern 197 of the common electrode 195. The spacer 325 is formed to overlap an upper edge and a lower edge of the slit pattern 197 and the gate line 121. Of the spacer 325, a length of a vertical direction of the portion overlapping the upper part of the slit pattern 197 may be about 2 μm to about 4 μm. In addition, the length of the vertical direction of the portion overlapping the lower edge of the slit pattern 197 may be about 2 μm to about 4 μm.

An electric field formation direction between the pixel electrode 191 and the common electrode 195 may be different from an electric field formation direction at the edge of the slit pattern 197 formed of the common electrode 195 such that a difference of a rotation direction of the liquid crystal molecules 310 may occur when forming the electric field, and thus the liquid crystal molecules 310 may collide.

In an exemplary embodiment of the present invention, the spacer 325 overlaps the upper edge and the lower edge of the slit pattern 197 such that the liquid crystal molecules 310 are not formed on the edge of the slit pattern 197. In other words, the spacer 325 is formed on the edge of the slit pattern 197 where the electric field formation direction is different from other areas such that the liquid crystal molecules 310 may not collide.

When the spacer 325 is formed on the first insulation substrate 110, an area of an upper surface of the spacer 325 is smaller than an area of a lower surface thereof. Accordingly, if an overlapping length of the spacer 325 and the slit pattern 197 is very small, the liquid crystal molecules 310 may be positioned on the edge of the slit pattern 197. Therefore, the overlapping length of the spacer 325 and the slit pattern 197 is about 2 μm or more.

A portion of the edge of the slit pattern 197 may be formed outside the pixel area, however most of the slit pattern 197 is formed in the pixel area. Accordingly, if the overlapping length of the spacer 325 and the slit pattern 197 is very long, an opening area of the pixel area is decreased. Accordingly, the overlapping length of the spacer 325 and the slit pattern 197 is about 4 μm or less.

One spacer 325 is formed to cover the lower edge of the slit patterns 197 positioned in the upper pixel area and the upper edge of the slit patterns 197 positioned in the lower pixel area among two adjacent pixel areas. In other words, the spacer 325 is formed on the edge of two adjacent pixel areas. The present invention is not limited thereto, and one spacer 325 may cover the lower edge of the slit patterns 197 positioned in the upper pixel area and another spacer 325 may cover the upper edge of the slit patterns 197 positioned in the lower pixel area.

The spacer 325 may cover the edges of all slit patterns 197 positioned in a plurality of pixel areas. In this case, the number of spacers 325 is substantially the same as the number of pixel areas. However, the present invention is not limited thereto, and the number of spacers 325 may be 65% to 105% of the number of pixel areas.

When the number of spacers 325 is large, the liquid crystal layer 3 may not be uniformly formed on all pixel areas. However, by using a microdrop filling (MDF) method to drip the liquid crystal, uniformity may be achieved. In other words, the liquid crystal is dripped into each pixel area by using an inkjet method to form the liquid crystal layer 3.

When forming the spacers 325 that are not connected with two adjacent pixel areas, the number of spacers 325 may be 200% or more of the number of pixel areas.

A resolution of the display device according to an exemplary embodiment of the present invention may be high resolution of more than 400 pixels per inch (ppi). The number of pixel areas may be more than 400 in a quadrangle with a transverse length of about 1 inch and a longitudinal length of about 1 inch. For example, the display device according to an exemplary embodiment of the present invention may be made with a resolution of 528 ppi.

In the present exemplary embodiment, the pixel electrode 191 and the common electrode 195 overlap each other via the insulating layer 193. The pixel electrode 191 is formed under the insulating layer 193 and the common electrode 195 is formed on the insulating layer 193. However, the present invention is not limited thereto, and the common electrode 195 may be formed under the pixel electrode 191.

In addition, in the present exemplary embodiment, the slit pattern 197 is formed of an opening formed in the common electrode 195. However, the present invention is not limited thereto, and the slit pattern 197 may be formed in the pixel electrode 191. In addition, the shape of the common electrode 195 and the pixel electrode 191 may be a slit shape.

Further, in the present exemplary embodiment, the slit pattern 197 extends in the direction parallel to the data line 171. However, the present invention is not limited thereto, and the slit pattern 197 may be formed of a shape extending in a direction parallel to the gate line 121. In this case, the spacer 325 may overlap a right edge and a left edge of the slit pattern 197 and the data line 171.

Next, a display device according to an exemplary embodiment of the present invention will be described with reference to FIG. 5.

Figure 5:
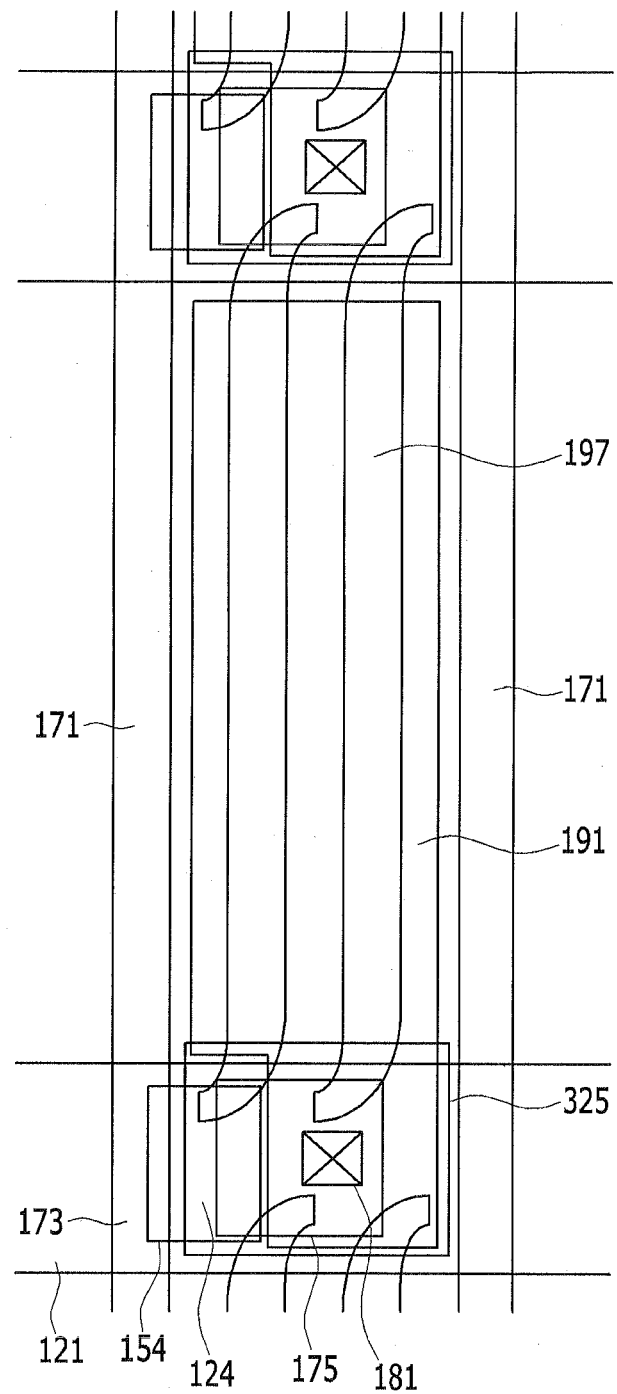
FIG. 5 is a layout view of a partial pixel of a display device according to an exemplary embodiment of the present invention.

FIG. 5 is a layout view of a partial pixel of a display device according to an exemplary embodiment of the present invention. The cross-section of the display device according to the current exemplary embodiment of the present invention is substantially the same as the cross-section of the previous exemplary embodiment such that a description thereof is omitted.

The display device according to the current exemplary embodiment of the present invention is substantially the same as most of the previous exemplary embodiment such that the description of overlapping parts is omitted and mostly differences will be described hereinafter.

In the display device according to the current exemplary embodiment of the present invention, like the previous exemplary embodiment, the gate line 121, the gate electrode 124, the data line 171, the source electrode 173, the drain electrode 175, the pixel electrode 191, and the common electrode 195 are formed on the first insulation substrate 110.

The common electrode 195 includes the slit pattern 197, and the shape of the slit pattern 197 is different from that of the previous exemplary embodiment. A center portion of the slit pattern 197 extends in the direction parallel to the data line 171 thereby forming a straight shape, and the edge of the slit pattern 197 is a curved line shape bent from the center portion. The upper edge of the slit pattern 197 is made of a shape that is curved from the center portion to the right side, and the lower edge of the slit pattern 197 is made of a shape that is curved from the center portion to the left side.

The shape of the edge of the slit pattern 197 of the present invention is not limited thereto, and the upper edge of the slit pattern 197 may be made of a shape that is curved from the center portion to the left side, and the lower edge of the slit pattern 197 may be made of a shape that is curved from the center portion to the right side. In addition, the upper edge and the lower edge of the slit pattern 197 may both be curved in the same direction.

The spacer 325 is formed on the common electrode 195, and the spacer 325 overlaps the upper edge and the lower edge of the slit pattern 197 of the common electrode 195. The spacer 325 mainly overlaps the portion of the slit pattern 197 made of the curved shape. Accordingly, the liquid crystal molecules 310 are not formed on the edge of the slit pattern 197 and collision between the liquid crystal molecules 310 does not occur.

In an exemplary embodiment of the present invention, the spacer 325 overlaps the edge of the slit pattern 197 such that the liquid crystal molecules 310 are not formed on the edge of the slit pattern 197, and as a result, the rotation direction of the liquid crystal molecules 310 is not influenced by the shape of the slit pattern 197. Accordingly, the shape of the edge of the slit pattern 197 of the present invention is not limited to the shape of FIG. 2 and FIG. 5, and various shapes are possible. For example, the upper edge and the lower edge of the slit pattern 197 in FIG. 5 may be slanted in different or the same directions. In addition, the slit pattern 197 in FIG. 2 may be bent.

Next, stable rotation of the liquid crystal in a display device according to an exemplary embodiment of the present invention will be described with reference to FIG. 6 to FIG. 8.

Figure 6:
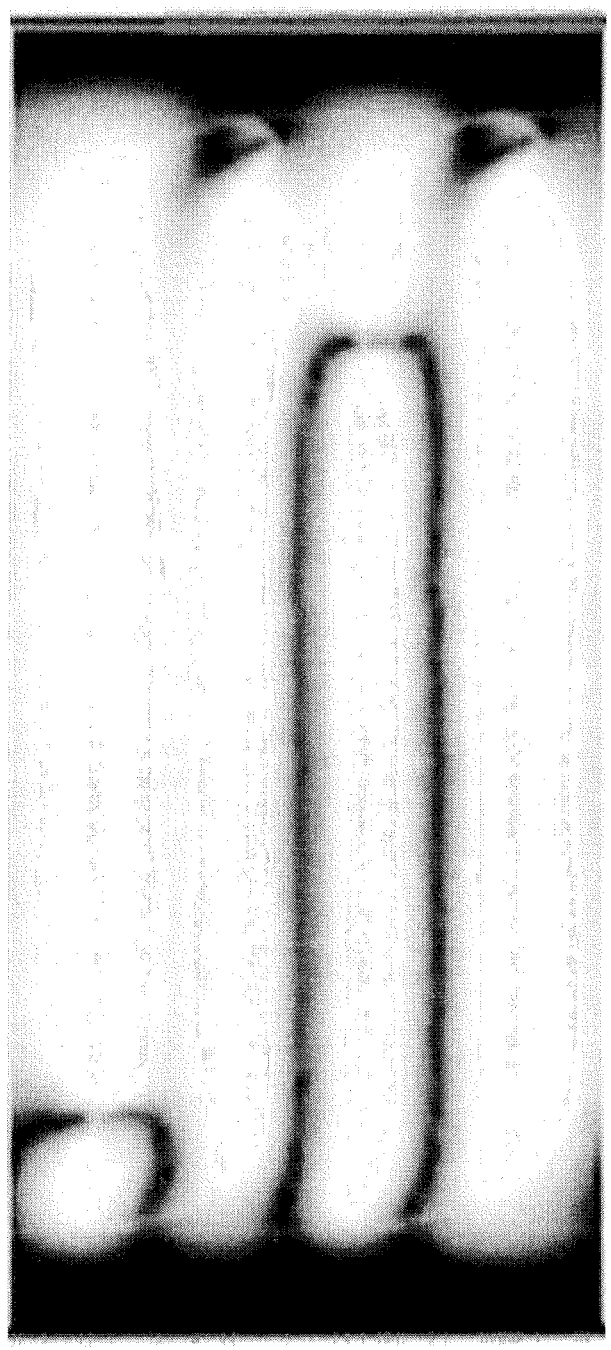
FIG. 6 is a simulation result of the state of a pixel when an electric field is applied in a display device as a comparative example.
Figure 7:
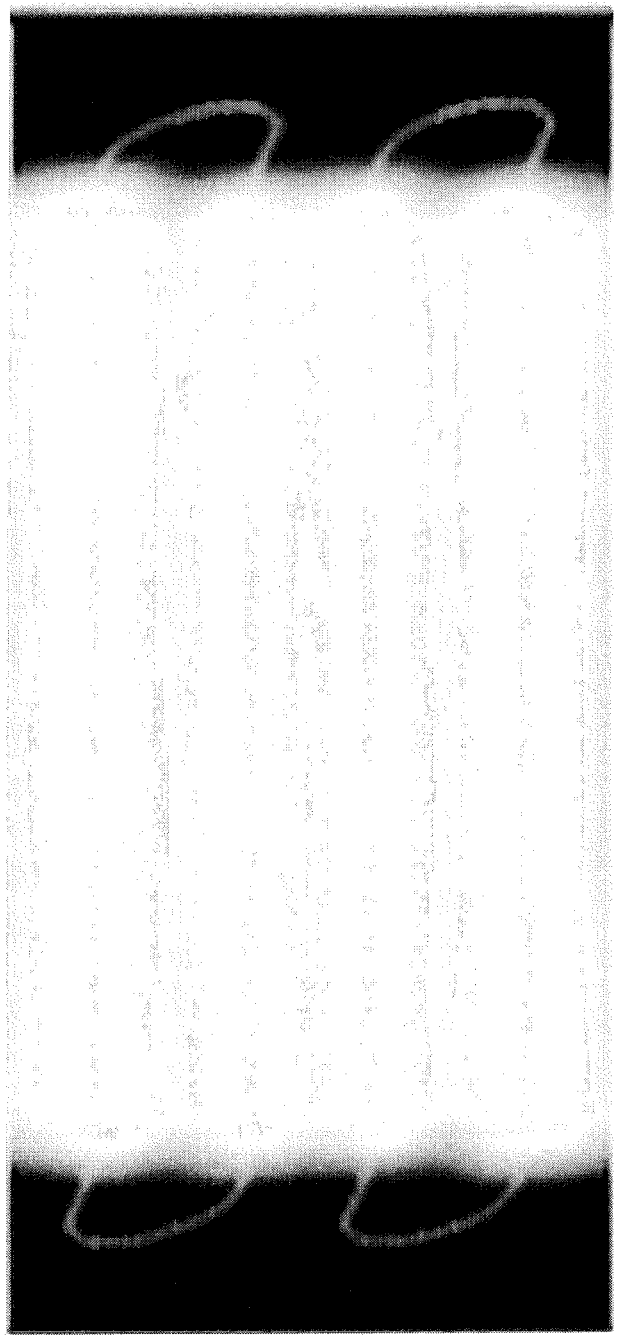
FIG. 7 and FIG. 8 are simulation results of the state of a pixel when an electric field is applied in a display device according to an exemplary embodiment of the present invention.
Figure 8:

FIG. 6 is a simulation result of the state of a pixel when an electric field is applied in a display device used as a comparative example, and FIG. 7 and FIG. 8 are simulation results of the state of a pixel when an electric field is applied in a display device according to an exemplary embodiment of the present invention.

The comparative example used in the simulation of FIG. 6 is a structure in which the spacer and the slit pattern do not overlap each other unlike the display device shown in FIG. 5. When the spacer does not overlap the edge of the slit pattern, the liquid crystal molecules may be positioned on the edge of the slit pattern.

In this case, if an initial alignment direction of the liquid crystal molecules positioned on the edge of the slit pattern is rotated by about 60 degrees due to the application of an external force to the display device and then the electric field is applied, the liquid crystal molecules collide. Accordingly, the slit pattern may be recognized by a user.

The structure used in the simulation of FIG. 7 and FIG. 8 is similar to the display device shown in FIG. 5. The spacer overlaps the edge of the slit pattern such that the liquid crystal molecules are not positioned on the edge of the slit pattern.

In this case, as shown in FIG. 7, although an initial alignment direction of the liquid crystal molecules is rotated by about 60 degrees due to the application of an external force to the display device and then the electric field is applied, the liquid crystal molecules do not collide.

In addition, as shown in FIG. 8, although an initial alignment direction of the liquid crystal molecules is rotated by about 120 degrees due to the application of an external force to the display device and then the electric field is applied, the liquid crystal molecules do not collide.

In other words, in the display device according to an exemplary embodiment of the present invention, the collision of the liquid crystal molecules is prevented when applying the electric field such that the liquid crystal molecules may be stably rotated. The collision is prevented by the spacer that overlaps the edge of the slit pattern formed in the first or second field generating electrodes, for example. The electric field may be a horizontal electric field.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device, comprising:
   a first insulation substrate and a second insulation substrate facing each other;
   a first field generating electrode and a second field generating electrode disposed on the first insulation substrate, wherein the first and second field generating electrodes overlap each other via an insulating layer;
   a first signal line and a second signal line disposed on the first insulation substrate and connected to the first field generating electrode;
   a slit pattern disposed in the first field generating electrode or the second field generating electrode; and
   a spacer disposed between the first insulation substrate and the second insulation substrate, wherein the spacer overlaps about 2 μm to about 4 μm of the slit pattern.

2. The display device of claim 1, further comprising a plurality of pixel areas, wherein the slit pattern is disposed within a first pixel area of the pixel areas.

3. The display device of claim 2, wherein the first field generating electrode is disposed within the first pixel area, and
   the second field generating electrode is disposed on a surface of the first insulation substrate.

4. The display device of claim 3, wherein the slit pattern is an opening in the second field generating electrode.

5. The display device of claim 4, wherein the first pixel area is defined by an intersection of the first and second signal lines.

6. The display device of claim 5, wherein the slit pattern is disposed in a direction parallel to the second signal line.

7. The display device of claim 6, wherein the spacer overlaps an upper edge of the slit pattern, a lower edge of the slit pattern or the first signal line.

8. The display device of claim 7, wherein the spacer overlaps about 2 μm to about 4 μm of the upper edge or the lower edge of the slit pattern.

9. The display device of claim 2, wherein the spacer is a column spacer on the first insulation substrate.

10. The display device of claim 2, wherein the display device has a resolution of more than 400 pixels per inch.

11. The display device of claim 2, wherein the spacer is one of a plurality of spacers and a number of the spacers is 65% to 105% of a number of the pixel areas.

12. The display device of claim 2, wherein the spacer covers a plurality of slit patterns.

13. A display device, comprising;
   a plurality of pixel areas;
   a first insulation substrate and a second insulation substrate facing each other;
   a first field generating electrode and a second field generating electrode disposed on the first i insulation substrate, Wherein the first and second field generating electrodes overlap each other via an insulating layer;
   a first signal line and a second signal line disposed on the first insulation substrate and connected to the first field generating electrode;
   a slit pattern disposed in the first field generating electrode or the second field generating electrode; and
   a plurality of spacers formed between the first insulation substrate and the second insulation substrate, wherein a number of the spacers is 65% to 105% of a number of the pixel areas,
   wherein the slit pattern is disposed within a first pixel area of the pixel areas, and
   a first spacer of the spacers overlaps a portion of the slit pattern,
   wherein the first spacer overlaps about 2 μm to about 4 μm of the slit pattern.

14. The display device of claim 13, wherein the first spacer covers a plurality of slit patterns.

15. The display device of claim 13, wherein the first spacer is a column spacer on the first insulation substrate.

16. The display device of claim 13, wherein the display device has a resolution of more than 400 pixels per inch.

17. The display device of claim 13, wherein the first signal line and the second signal line are crossed,
   the slit pattern is disposed in a direction parallel to the second signal line, and
   the first spacer overlaps an upper edge of the slit pattern, a lower edge of the slit pattern, or the first signal line.

* * * * *